United States Patent [19]

Eguchi et al.

[11] Patent Number: 5,402,407
[45] Date of Patent: Mar. 28, 1995

[54] OPTICAL PICKUP APPARATUS AND METHOD FOR ADJUSTING OPTICAL AXIS THEREOF

[75] Inventors: Naoya Eguchi, Tokyo; Fumisada Maeda, Kanagawa, both of Japan

[73] Assignee: Sony Corporation, Tokyo, Japan

[21] Appl. No.: 78,038

[22] Filed: Jun. 18, 1993

[30] Foreign Application Priority Data

Jun. 19, 1992 [JP] Japan .................................. 4-161504
Jun. 19, 1992 [JP] Japan .................................. 4-184787

[51] Int. Cl.⁶ ............................................. G11B 7/125
[52] U.S. Cl. ..................... 369/112; 369/44.14; 369/44.23; 372/22; 372/105
[58] Field of Search ................ 369/112, 44.24, 44.14, 369/44.23; 359/205, 206; 372/22, 92, 105, 98; 351/208, 211

[56] References Cited

U.S. PATENT DOCUMENTS

| 3,905,703 | 9/1975 | Matsumoto | 369/44.24 |
|---|---|---|---|
| 4,617,666 | 10/1986 | Liu | 372/22 |
| 4,718,052 | 1/1988 | Kondo et al. | 369/44.12 |
| 4,910,740 | 3/1990 | Oka | 372/22 |
| 5,058,118 | 10/1991 | Qui et al. | 372/21 |
| 5,126,563 | 6/1992 | Aikoh et al. | 369/44.23 |
| 5,148,010 | 9/1992 | Mori | 369/44.23 |
| 5,220,450 | 6/1993 | Iizuka | 359/205 |
| 5,272,689 | 12/1993 | Tsujioka et al. | 369/112 |
| 5,283,771 | 2/1994 | Kadowaki et al. | 369/112 |
| 5,289,479 | 2/1994 | Oka et al. | 372/22 |
| 5,313,447 | 5/1994 | Takeshita et al. | 369/112 |
| 5,331,622 | 7/1994 | Ernst et al. | 369/112 |

FOREIGN PATENT DOCUMENTS 0358410 3/1990 European Pat. Off. .

OTHER PUBLICATIONS

Patent Abstracts of Japan JP 2306612 vol. 15, No. 98 (E-1042) 8 Mar. 1991.
Japanese Patent Abstract-JP62198181, vol. 12, No. 49, 1988.
Japanese Patent Abstract-JP4025083, vol. 16, No. 188, 1992.

*Primary Examiner*—Paul M. Dzierzynski
*Assistant Examiner*—Kim-Kwok Chu
*Attorney, Agent, or Firm*—Hill, Steadman & Simpson

[57] ABSTRACT

A method for the optical axis of an optical pickup apparatus includes the step of adjusting the optical axis of a beam expander for enlarging the diameter of a light beam outgoing from a laser light beam radiating device into coincidence with the optical axis of the light beam radiated from the laser light beam radiating device. The laser light beam radiating device includes a non-linear optical crystal element and is adapted for radiating a second harmonic laser light beam. The method also includes the step of mounting the beam expander having adjusted its optical axis, and a step of adjusting, with the beam expander mounted on the laser light radiating device, the optical axis of an optical system converging the laser light beam radiated from the laser light beam radiating device so that the optical axis is brought into coincidence with the optical axis of the laser beam radiated from the laser light beam radiating device.

5 Claims, 6 Drawing Sheets

OPTICAL PICKUP APPARATUS AND METHOD FOR ADJUSTING OPTICAL AXIS THEREOF

BACKGROUND

1. Field of the Invention

The present invention relates to an optical pickup apparatus and a method for adjusting its optical axis. More particularly, the present application relates to an optical pickup apparatus having a solid-state laser having a resonator as a light beam source, and a method for adjusting its optical axis.

2. Background of the Invention

An output light beam emanated from a light beam source, such as a solid-state laser, a gas laser etc. having a resonator, has an extremely narrow angle of dispersion of e.g. several milliradians, in distinction from a light beam emitted from a semiconductor laser element, and is a light beam approximate to a collimated beam having a small beam diameter. For irradiating e.g. an optical disc, with a light beam converged by an objective lens, a light beam incident on the objective lens is converged more satisfactorily if the incident light beam has a certain width. Therefore, it is necessary to enlarge the diameter of the narrow light beam. Consequently, with an optical pickup apparatus employing a solid-state laser or a gas laser, an optical device, known as a beam expander, consisting of a combination of plural lenses, is employed for creating a light beam of a larger beam diameter.

FIG. 1 schematically shows an arrangement of an optical pickup apparatus which employs the beam expander and which constitutes the background art for the present invention.

In FIG. 1, a reference numeral 101 is a laser light radiating device, more specifically, a solid-state laser device employing a laser medium such as KTP(KTiPO$_4$). A mirror 102 deflects the laser beam radiated from the laser light radiating device 101 by 90°. A beam expander 103 is made up of a combination of two concave lenses. A reference numeral 104 is a diffraction grating for separating the light radiating device into at least three light beams. A polarization beam splitter 105 separates the light beam emanated from the laser light radiating device 101 from a light beam reflected by an optical disc 109. A collimator lens 106 collimates the light beam enlarged in diameter by the beam expander 103. A reference numeral 107 is a quarter wave plate for converting the light beam generated by the laser light beam radiating device 101 into a linear polarized light beam and converting the return beam from the optical disc 109 into a circular polarized light beam. An objective lens 108 converges the light beam collimated by the collimator lens 106 on the optical disc 109. The optical disc 109 carries information signals recorded in the optically readable form, that is, as embossed pits or changes in reflectivity.

A reference numeral 110 is a multiple lens for converging a light beam separated by the polarization beam splitter 105 on a photodetector 111. The multiple lens 110 is made up of a single lens or a single optical element exhibiting a light converging operation and an optical element for detecting focusing errors.

The light beam radiated from the laser light beam radiating device 101 is bent by 90° by the mirror 102 to fall on the beam expander 103. The light beam incident on the beam expander 103 is enlarged in diameter to proceed to the collimator lens 106 through the grating 104 and the polarization beam splitter 105. The collimator lens 106 collimates the light beam enlarged in diameter. The collimated light beam proceeds to the objective lens 108 through the quarter wave plate 107. The objective lens 108 radiates the incident collimated light on the optical disc 109 so as to be converged thereat. The light beam reflected by the optical disc 109 is re-incident on the polarization beam splitter 105 through the objective lens 108, the quarter wave plate 107 and the collimator lens 106. The reflected light beam is reflected substantially totally by the reflecting surface of the polarization beam splitter 105 so as to be radiated on the photodetector 111 through the multiple lens 110.

Meanwhile, the optical axis of the beam expander 103 is fixed against inadvertent movement once it is adjusted into alignment with the optical axis of the collimated light beam from the collimator lens 106. As a result, for aligning the optical axis of the beam expander 103 with that of the laser light beam radiating device 101, it is necessary to adjust the vertical deflection of the light beam from the mirror 102 towards the beam expander 103 as well as the position of the laser light beam radiating device 101. Specifically, two degrees of freedom of rotation about x and z axes and one degree of freedom of translation along x axis need to be accorded to the mirror 102, while one degree of freedom along z axis needs to be accorded to the laser light beam radiating device 101, as indicated by arrows in FIG. 1. These two degrees of freedom of rotation and one degree of freedom of translation are adjusted for aligning the optical axis of the beam expander 103 with that of the laser light beam radiating device 101. However, such adjustment, above all, the adjustment of the rotation, is difficult to perform, so that the optical pickup apparatus itself becomes bulky in size to hinder the reduction in size of the device.

SUMMARY OF THE INVENTION

It is an object of the present invention to provide a method for adjusting the optical axis of the optical pickup apparatus which resolves above-mentioned problems.

It is another object of the present invention to provide an optical pickup apparatus which permits ease of adjustment despite its simplified structure.

It is a further object of the present invention to provide a laser light beam radiating device in which the return light beam is not returned back to the laser light beam radiating device.

According to a first embodiment of the present invention, there is provided a method for adjusting the optical axis of an optical system including the steps of adjusting a beam expander for enlarging the diameter of a light beam radiated from a laser light beam radiating device so that the optical axis of the beam expander is coincident with the optical axis of the light beam radiated from the laser light beam radiating device, mounting the beam expander after adjustment thereof on the laser light beam radiating device, and adjusting the laser light beam radiating device, with the beam expander mounted thereon, so that the optical axis of the optical system for converging the laser light beam radiated from the laser light beam radiating device at a point on an outgoing optical axis is coincident with the optical axis of the outgoing light beam from the laser light beam radiating device.

According to a second embodiment of the present invention, there is an optical pickup apparatus including a laser light beam radiating device, a beam expander and an optical system. The laser light beam has a laser medium arranged between a pair of mirror members making up a resonator, a laser light source for irradiating the laser medium from a light incident side one of the mirror members for exciting the laser medium and a non-linear optical crystal element irradiated With a laser beam radiated from the laser medium. The beam expander expands the diameter of the light beam radiated from the laser light beam radiating device. The beam expander is arranged so that its optical axis is coincident with the optical axis of the light beam radiated from the laser light radiating device. The optical system arranged so that its optical axis is coincident with the optical axis of the light beam from the beam expander. The optical system causes the light beam radiated from the laser light radiating device to be converged on an optical recording medium. , According to a third embodiment of the present invention, there is provided a case for a laser light beam radiating device. The case has a housing and a closure member. The housing has an opening and is adapted for housing the laser light beam radiating device therein. The closure member for closing the opening includes a window in which the optical element exhibiting wavelength selectivity is obliquely mounted, and a laser light beam which is radiated from the laser light beam radiating device passes outside through the window.

DESCRIPTION OF THE INVENTION

Figure 1:
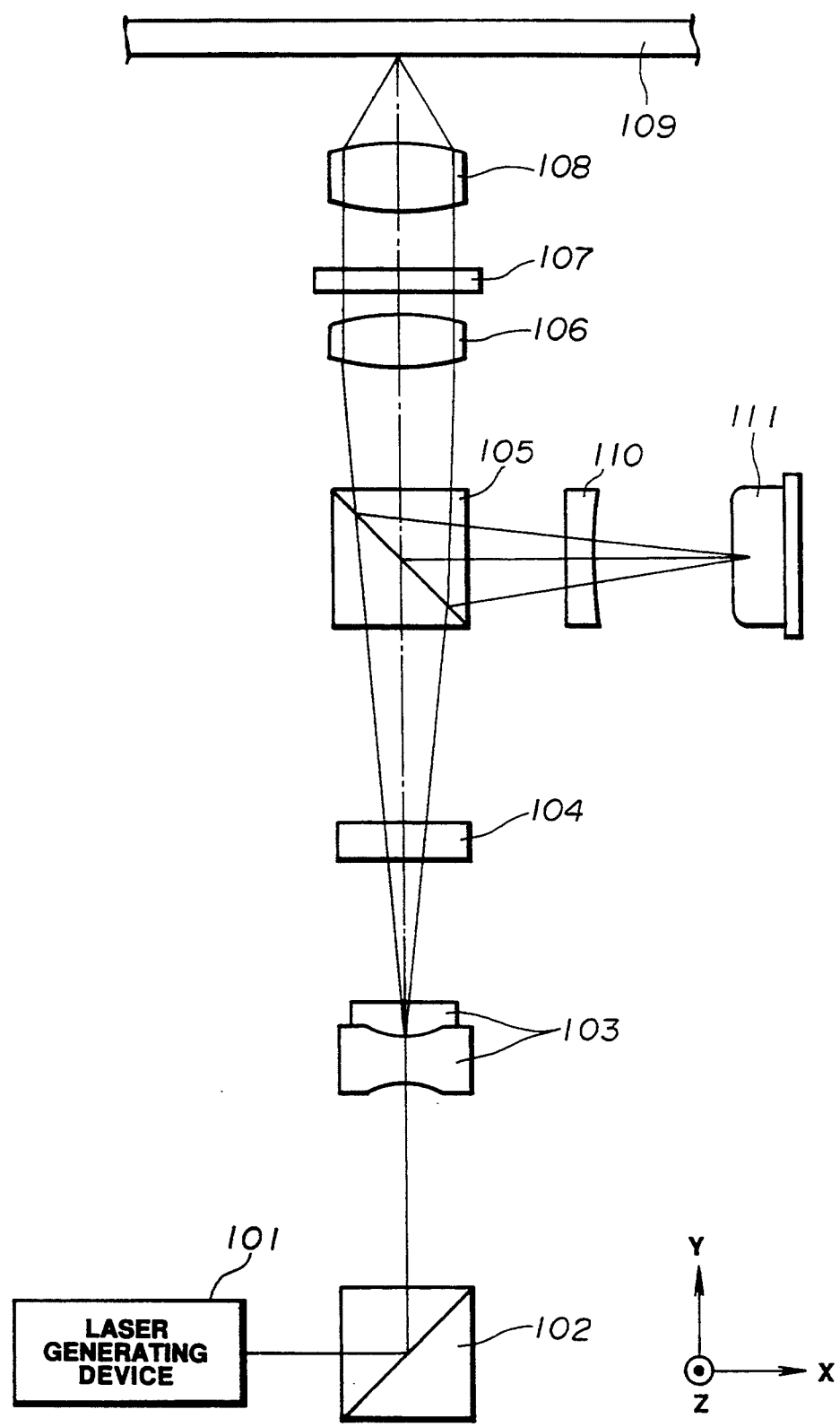
FIG. 1 is a schematic view showing an arrangement of an optical pickup apparatus which is to be the background art for the present invention.

Referring to the drawings, preferred embodiments of the optical pickup apparatus and the method for adjusting the optical axis thereof, according to the present invention, are explained in detail.

Figure 2:
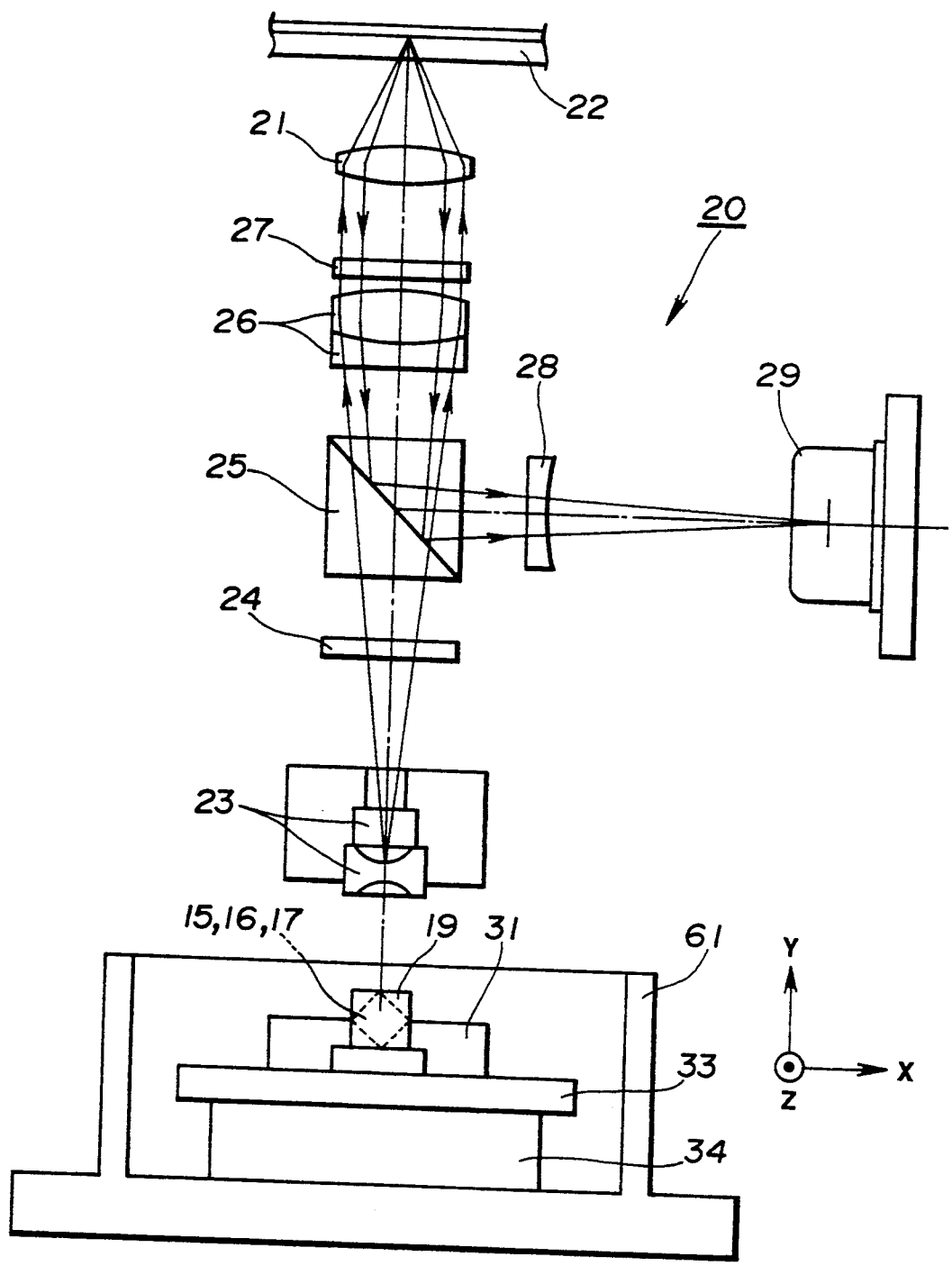
FIG. 2 is a schematic front view showing an optical pickup apparatus according to the present invention and a method for adjusting its optical axis.
Figure 3:
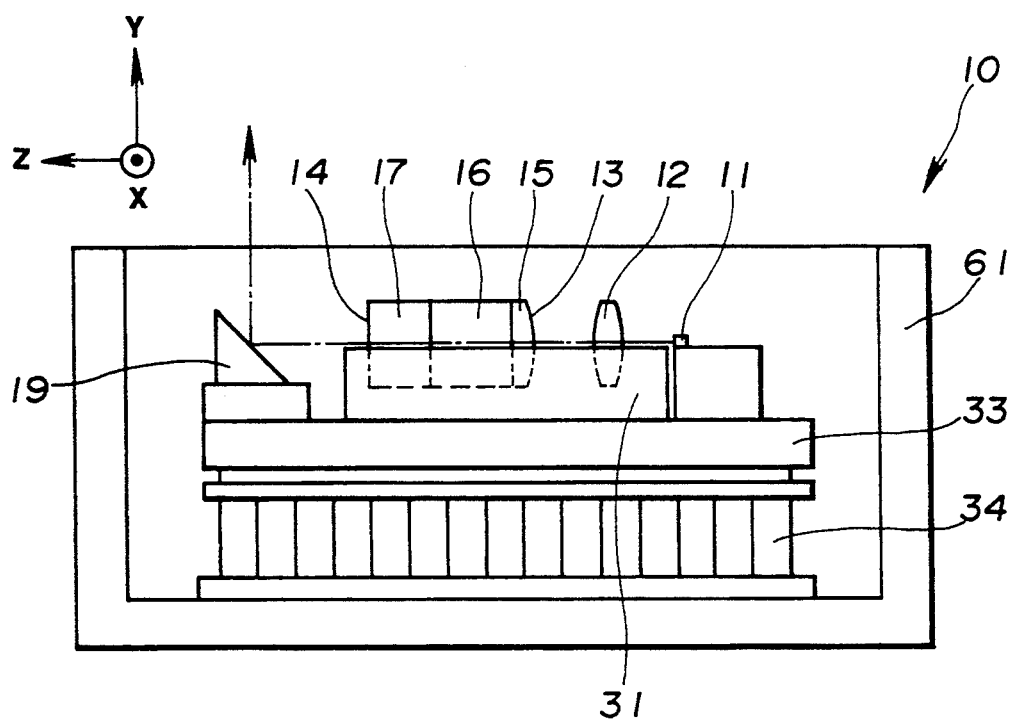
FIG. 3 is a schematic transverse sectional view showing a laser light beam radiating device to which the present invention is applied.
Figure 4:
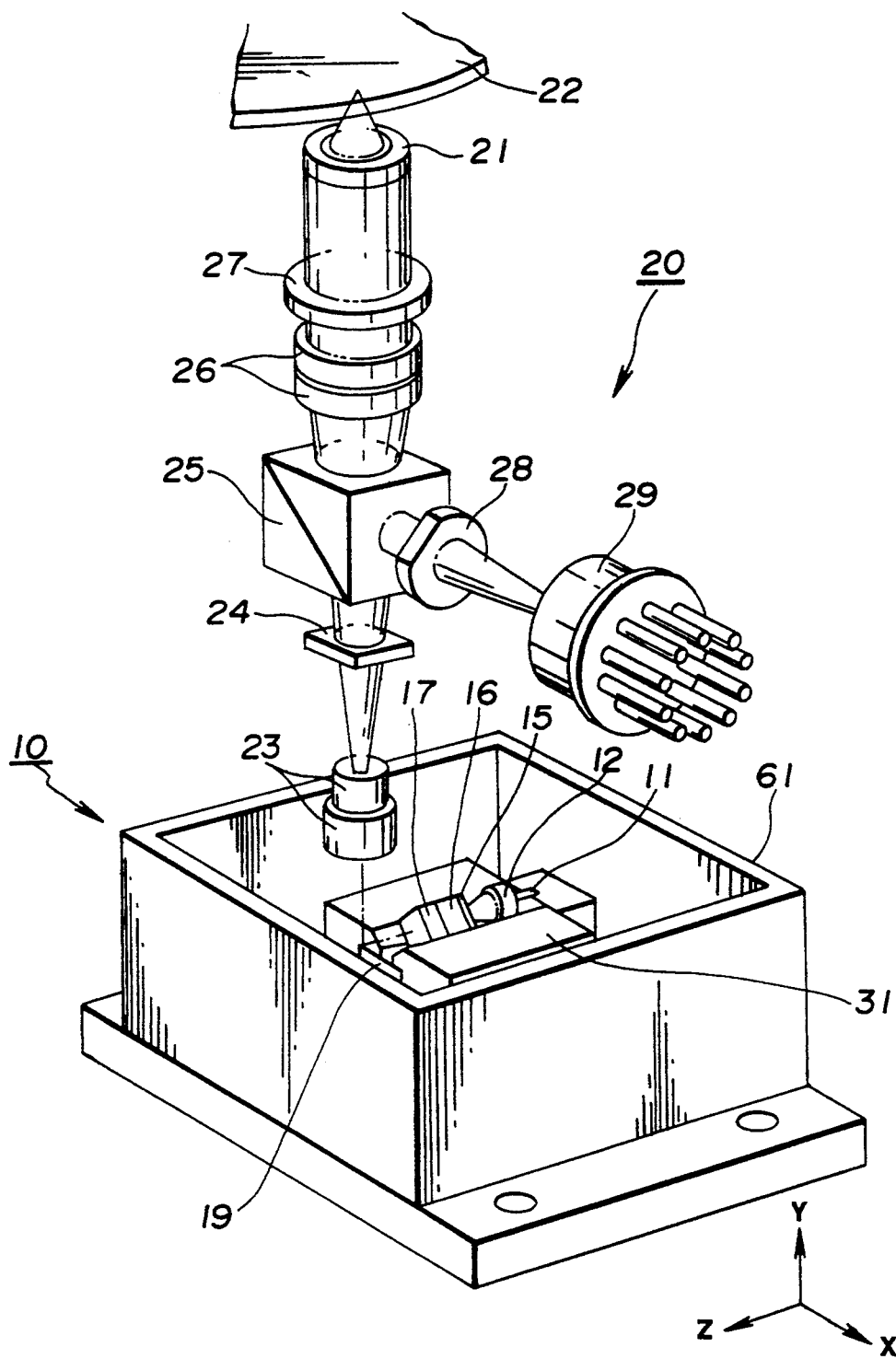
FIG. 4 is a schematic perspective view showing an arrangement of the present invention.

First, an embodiment of the optical pickup apparatus according to the present invention is explained by referring to FIG. 2 which shows the entire device in a schematic front view, FIG. 3 which shows the entire device in a schematic perspective view and to FIG. 4 which shows the device in perspective in its entirety.

In the illustrated embodiment of the optical pickup apparatus 20, a laser-light beam radiating device 10, as a light source, has a small-sized compact structure, as shown in FIG. 3. That is, referring to FIGS. 3 and 4, the laser light beam radiating device 10 includes a semiconductor laser device 11, a lens 12, a pair of reflecting surfaces 13, 14, a quarter wave plate 15, a laser medium 16 and a non-linear optical crystal element 17. The semiconductor laser device 11 generates an excitation light beam for exciting the laser medium 16. The lens 12 converges the excitation light beam, radiated from the semiconductor laser device 11, on the laser medium 16 through the reflecting surface 13. The pair of reflecting surfaces 13, 14 make up a resonator. The laser medium 16 and the non-linear optical crystal element 17 are arranged within the resonator constituted the reflecting surfaces 13, 14. The surface of the quarter wave plate 15 facing the semiconductor laser device 11 has the reflective surface 13 which, when viewed from the side of the laser medium 16, is a concave mirror. The reflecting surface 13 exhibits wavelength selectivity such that it transmits the light beam having a wavelength of 810 nm while reflecting the light beam from the laser medium 16 having a wavelength of 1064 nm. The quarter wave plate 15 effectuates type II phase matching between a light beam radiated from the laser medium 16 (fundamental wavelength laser light) and the second harmonic laser light beam generated by the non-linear optical crystal element 17. U.S. Pat. No. 4,910,740 a type II phase matching system.

The laser medium 16 is a rod-shaped laser medium, such as Nd:YAG. The pumping light beam is radiated through the reflecting surface 13 onto the laser medium 16. The laser medium 16 generates the fundamental wavelength laser light beam. The non-linear optical crystal element 17 is formed of KTP(KTiPO4). The non-linear optical crystal element 17 generates second harmonic laser light beam responsive to the fundamental wavelength laser light beam irradiated thereto. The reflecting surface 14 is formed on one of the surfaces of the non-linear optical crystal element 17. The reflecting surface 14 exhibits wavelength selectivity such that it reflects the laser light beam of the fundamental wavelength, such as the light beam of a wavelength of 1064 nm, and transmits the second harmonic laser light beam generated by the non-linear optical crystal element 17, such as a light beam having a wavelength of 532 nm. The quarter wave plate 15, the laser medium 16 and the non-linear optical crystal element 17 are integrally bonded to one another.

A mirror 19 for upwardly deflecting the light beam by 45° is adapted to deflect the second harmonic laser light beam, emanated from the reflecting surface 14 along the z-axis, by 90°, so that the deflected light beam is radiated along the y-axis.

Referring to FIG. 3, a reference numeral 31 is a stationary block to which the resonator is secured. A reference numeral 33 is a base which mounts the stationary block 31 carrying the resonator, the mirror 19 and the semiconductor laser device 11. A reference numeral 34 is a thermo-electric (THE) cooler as a unitary temperature controlling device. The semiconductor laser device 11, the resonator, the mirror 19, the stationary block 31 and the temperature controlling device 34 are housed within a casing 601shown in FIG. 6.

With the above-described laser light beam radiating device 10, the pumping light beam radiated from the semiconductor laser device 11 is converged by the lens 12 so as to be radiated on the laser medium 16 through the reflecting surface 13 and the quarter wave plate 15. The laser light beam of the fundamental wavelength is generated responsive to the pumping light beam radiated on the laser medium 16. The laser light beam of the fundamental wavelength is radiated on the non-linear optical crystal element 17. The second harmonic laser light beam is generated by the non-linear optical crystal element 17 so as to be radiated from the reflecting surface 14 of the resonator as the light radiating surface.

The laser light beam of the second harmonics, radiated through the reflecting surface 14, is deflected by 90° by the mirror 19. The second harmonic laser light beam, thus deflected by the mirror 19, is guided to an optical system shown in FIG. 2.

Figure 6:
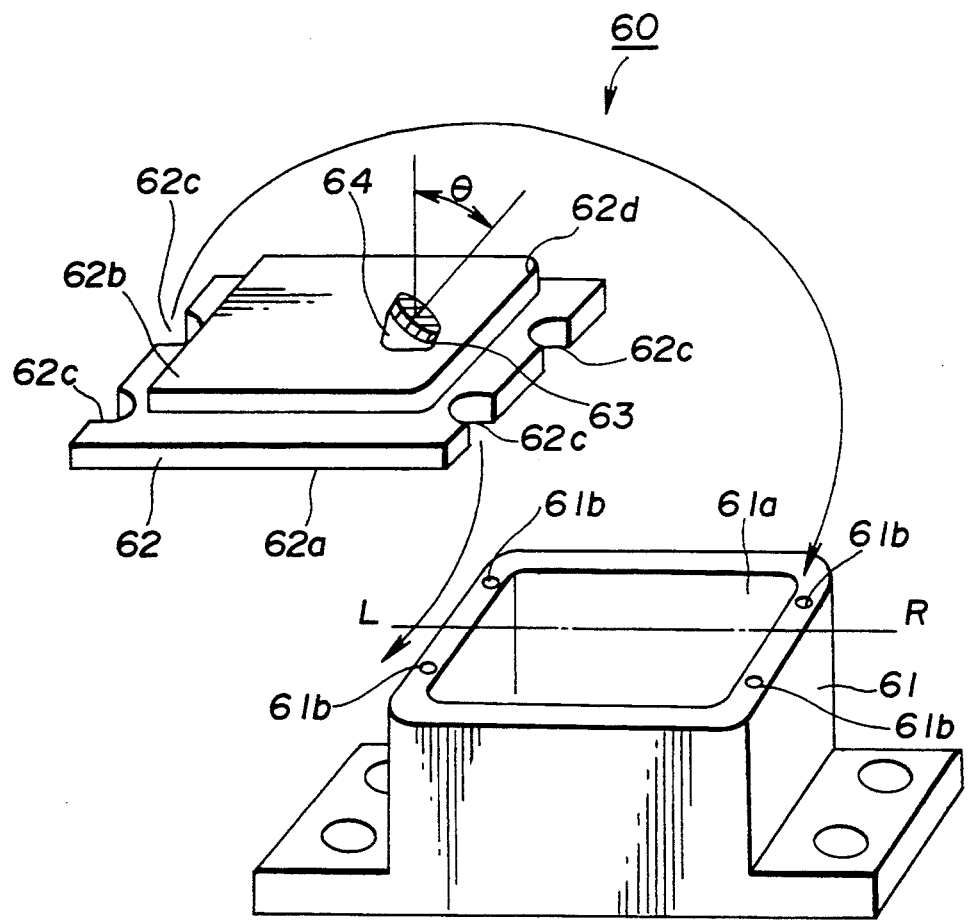
FIG. 6 is a schematic perspective view showing a case of the laser light beam radiating device.
Figure 7:
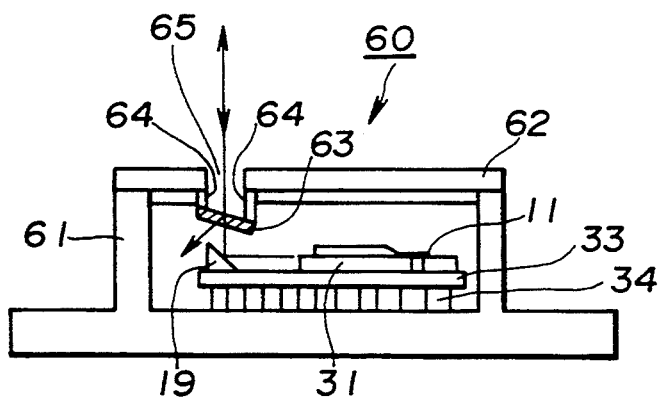
FIG. 7 is a transverse cross-sectional view showing the case shown in FIG. 7.

Referring to FIGS. 6 and 7, the case 60 includes a casing body 61 and a lid 62. The body 61 constitutes an outer boundary of the laser radiating device 10 and has a hollow inner space within which the semiconductor laser device 11, the resonator, the mirror 19, the stationary block 31 and the temperature controlling device 34 are accommodated.

The body 61 has an opening 61a which is designed as a rectangular through-hole.

The lid 62 of the case 60 is mounted for closing the opening 61a. The lid 62, which is rectangular-shaped to cover the upper side of the body 61, has two tapped holes 61b along each of its longitudinal lateral sides. The lid 62 has a rectangular-shaped raised section 62d corresponding to the opening 61a and two cut-outs 62c along each of the lateral sides thereof in register with the tapped holes 61b of the body 61. The lid 62 is secured by set screws which pass through the cut-outs and into the tapped holes for enclosing the inner space of the case 60 from atmosphere.

The lid 62 includes an aperture for guiding the second harmonic laser light beam radiated from the resonator housed within the case 60 to the outside, as shown in FIG. 7. A plate-shaped optical element 63 is mounted within the aperture 65. The optical element 63 has a surface exhibiting wavelength selectivity such that it acts as an antireflection film with respect to the desired light beam and as an interference filter with respect to the light beam components other than desired light beam. The optical element 63 is mounted on lid 62 by a supporting section 64 so as to be tilted by an angle θ relative to a reference plane which is normal to the optical axis of the second harmonic laser light beam.

As a result, with the optical element 63 exhibiting wavelength selectivity, only the second harmonics, deflected by the mirror 19, will be radiated towards the optical system of the optical pickup apparatus 20 shown in FIG. 2.

By mounting the optical element 63 with a small tilt with respect to the reference plane normal to the optical axis of the optical pickup apparatus 20, it becomes possible to prevent wasteful return light beam from the optical apparatus 20 from reaching the resonator of the laser light beam radiating device 10.

In addition, by bonding the optical element 63 to the lid 62 by melting or with an adhesive, optical components contained within the case 60 may be sealed against contact with outside air.

The structure of the optical pickup apparatus 20 employing the above-mentioned laser light beam radiating device 10 is hereinafter explained. Referring to FIGS. 2 and 4, a reference numeral 22 is an optical disc on which information signals are recorded in an optically readable manner. The optical disc 22 may be such a disc on which information signals can be recorded optically. A reference numeral 23 is a beam expander made up of three concave lenses. A reference numeral 24 is a diffractive grating for separating a light beam emanated from the laser light beam radiating device 10 as a solid-state laser device into at least three light beams. A reference numeral 25 is a polarization beam splitter for separating the light beam radiated from the laser light beam radiating device 10 from the light beam reflected by the optical disc 22. A reference numeral 26 is a collimator lens for collimating a light beam enlarged in diameter by the beam expander 23. In the illustrated embodiment, the collimator lens 26 is made up of plural different lenses. A reference numeral 27 is a quarter wave plate for converting the light beam emanated from the laser light beam radiating device 10 into a linear polarized light beam and converting the linear polarized return beam from the optical disc 22 into a circular polarized light beam. A reference numeral 21 is an objective lens for converging the light beam, collimated by the collimator lens 26, on the optical disc 22.

A reference numeral 28 is a multiple lens for converging the light beam separated by the polarization beam splitter 25 on a photodetector 29. The multiple lens 28 is made up of a single lens or an optical element exhibiting a light beam converging performance and an optical element for detecting focusing errors. The photodetector 29 receives the light beam through the multiple lens 28. The output signal from the photodetector 29 is used to generate a focusing error signal, a tracking error signal and the other signal and to detect data recorded on the optical disc 22.

Referring to FIGS. 2 and 4, the second harmonic laser light beam, radiated by the mirror 19 proceeds to the polarization beam splitter 25 through the beam expander 23 and the diffraction grating 24 so as to be converged by the objective lens 21 on a recording surface of the optical disc 22 through the collimator lens 26 and the quarter wave plate 27. The reflected light beam from the recording surface of the optical disc 22 is incident on the polarization beam splitter 25 through the objective lens 21, the quarter wave plate 27 and lens 26 and is reflected by its boundary surface so as to be received by the photodetector 29 through the multiple lens 28 for reproducing recording signals.

The collimator lens 26 and the objective lens 21 are arranged on the optical axis of the light beam, on which the beam expander 23 is also set, with the optical axes of the lenses and the light beam being in alignment with each other. Consequently, the laser light beam radiated from the laser light beam radiating device 10 is converged on the recording surface of the optical disc 22.

The beam expander 3 is made up of plural concave lenses, and those lenses which the smaller radius of curvature are placed near the side of the laser light beam radiating device 10 for preventing wave front aberration characteristics of the lenses from being deteriorated.

Figure 5:
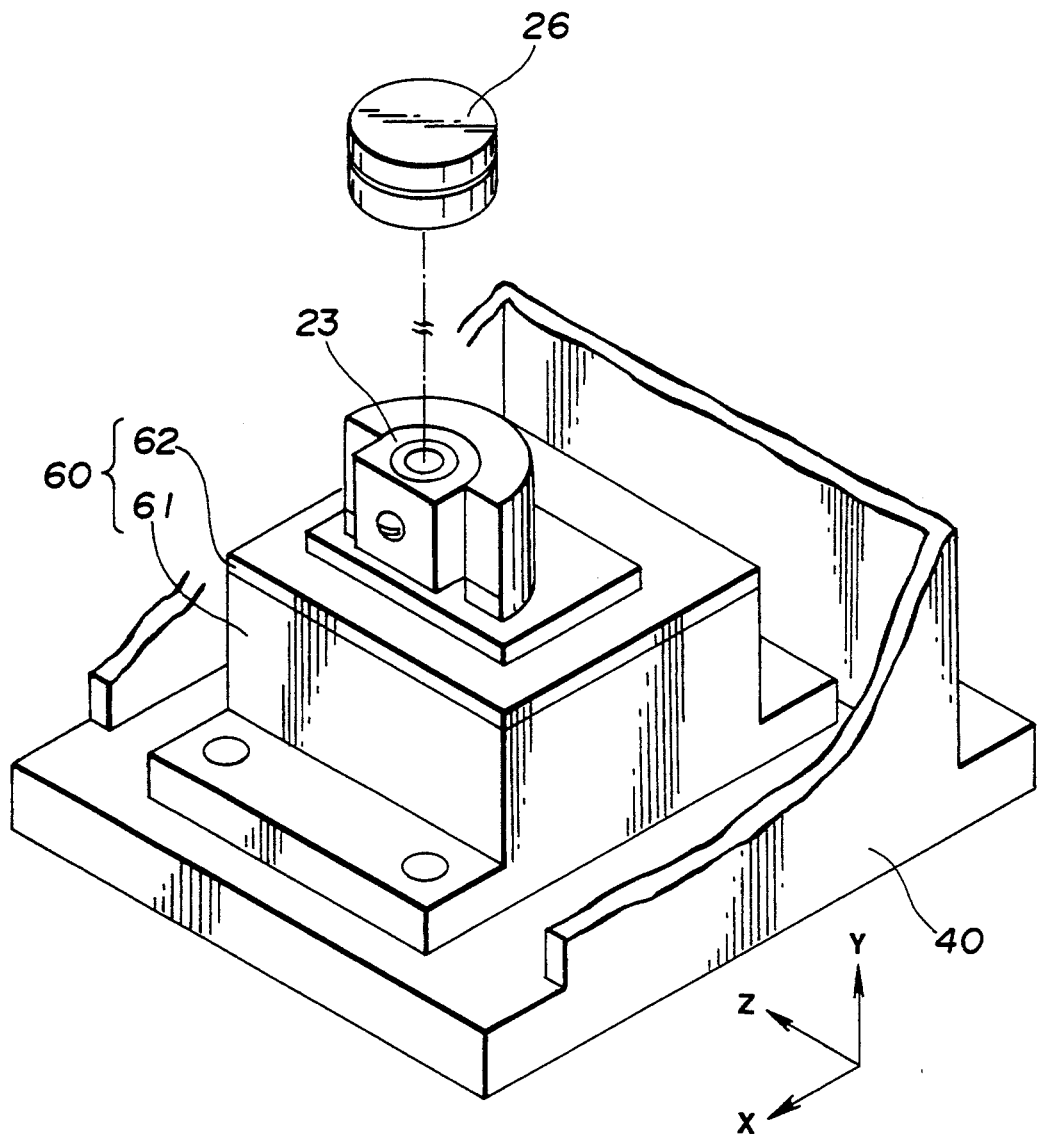
FIG. 5 is a perspective view for illustrating the method for adjusting the optical axis according to the present invention.

FIGS. 2 to 5 illustrate the method of adjusting the optical axis of the laser light beam radiating device 10 into alignment with the optical axes of the beam expander 23 and the collimator lens 26. The above-described embodiment of the optical pickup apparatus 20 is hereinafter explained. It is to be noted that FIG. 5 shows the laser light beam radiating device 10, the beam expander 23 and the collimator lens 26.

The beam expander 23 is secured to the case 60 of the laser light beam radiating device 10 with freedom for translation in the directions shown by arrows x, y and z in FIG. 5. On the other hand, the laser light beam radiating device 10 is secured to a housing 40 of the optical pickup apparatus which has freedom for translational movement in the directions shown by arrows x, z relative to the optical axis of the collimator lens 26.

First, the beam expander 23 is adjusted along the axes x and on the case 60 of the laser light beam radiating device 10 so that the laser light beam which has been changed into a diffused light beam is not reflected by the collimator lens 26. After this adjustment, the beam expander 23 is secured to the laser light beam radiating device 10 so that it cannot perform translational movement in the directions x and z.

The beam expander 23 is then adjusted along the y-axis so that the diffused light beam is changed into a collimated light beam after passage through the collimator lens 26. After this adjustment, the beam expander 23 is secured to the laser light beam radiating device 10 so that it cannot perform translational movement along the direction y.

The laser light beam radiating device with the beam expander 23 secured to prevent translational movement in the three directions x, y and z, is adjusted for translational movement in the x and z directions with respect to the optical axis of the collimator lens 26 so as to the optical axis of the laser light beam radiating device 10 into parallelism with the optical axis of the collimator lens 26. After this adjustment, the laser light beam radiating device 10, while the beam expander 23 secured to prevent x, y and z movement, is secured to the housing 40 of the optical pickup apparatus 20.

That is, the beam expander 23 for enlarging the diameter of the light beam radiated from the laser light beam radiating device 10 is adjusted translation in the x, y and z directions of so that the optical axis of the beam expander 23 is aligned with the optical axis of the light beam radiated from the laser light beam radiating device 10. The beam expander 23 is subsequently mounted on the case 60 of the laser light beam radiating device 10. With the beam expander 23 thus mounted on the laser light beam radiating device 10, the laser light beam radiating device 10 is adjusted in of translation in two directions so as to the optical axis of the optical system constituted by the collimator lens 26 and the objective lens 21 which converge the outgoing light beam of the laser light beam radiating device 10 on the optical disc 22 into alignment with the optical axis of the outgoing light beam from the laser light beam radiating device 10.

In this manner, with the adjustment of the optical axes according to the present embodiment, the optical axis of the optical system of the collimator lens 26 and the objective lens 21 which converge the light beam on the optical disc 22 are brought into alignment with the light beam radiated from the laser light beam radiating device 10 by simply adjusting the beam expander 23 in translation in three directions and subsequently adjusting in translation the laser light beam radiating device 10 which has the beam expander secured thereto as described above. Consequently, the number of component parts are reduced with a simple arrangement and no complicated rotational adjustment is required.

What is claimed is:

1. A casing for a laser light beam radiating device comprising:
    a casing section having an opening and adapted for housing the laser light radiating device therein;
    a laser light generator mounted in said housing;
    a mirror mounted in said casing housing and deflecting the output light of said laser light generator by 90 degrees toward an optical axis;
    a closure member which covers said opening, said closure member having a window in which an optical element is mounted that exhibits wavelength selectivity and is mounted so as to intercept said deflected output light, said optical element mounted so that its surface is tilted at an angle $\phi$ which is other than zero relative to a reference plane which is normal to said optical axis.

2. A method for adjusting the optical axis of an optical system comprising the steps of:
    a case in which a laser light beam radiating device is mounted, a window in said case through which said laser light beam emerges,
    a beam expander movably mounted on said case and for enlarging the diameter of said laser light beam radiated from a laser light beam radiating device, adjusting said beam expander along x and z axis so that the optical axis of the beam expander coincides with the optical axis of the laser light beam radiated from said case, moving said beam expander in the y direction relative to said case, locking said beam expander to said case, moving said laser light beam radiating device in the x and z directions relative to said case to adjust the laser light beam, and
    wherein said laser light beam radiating device comprises a laser medium arranged between a pair of mirror members constituting a resonator, a laser light source for radiating a laser light beam from an incident side one of said mirror members for exciting said laser medium, a non-linear optical crystal element irradiated with a light beam emanated from said laser medium, and a reflective mirror for deviating the optical axis of the outgoing light beam from said mirror members, said method further comprising an adjustment step of bringing the optical axis of said beam expander into coincidence with the optical axis of the light beam deflected by said reflective mirror.

3. An optical pickup apparatus comprising:
    a laser light beam radiating device having a laser medium arranged between a pair of mirror members constituting a resonator, a laser light source for irradiating said laser medium from a light incident side one of said mirror members for exciting said laser medium, and a non-linear optical crystal element irradiated with an outgoing laser beam from said laser medium;
    a beam expander for enlarging the diameter of the light beam radiated from said laser light beam radiating device, said beam expander being arranged so that its optical axis is coincident with the optical axis of the laser light beam radiated from said laser light radiating device;
    a optical system arranged so that its optical axis is coincident with the optical axis of the light beam from said beam expander, said optical system causing the light beam from said laser light radiating device to be converged on an one point which is placed on outer side of the optical axis of the laser light beam and
    wherein said apparatus further comprises a case, said laser light beam radiating device is housed within said case which has an opening in which an optical element that exhibits wavelength selectivity is mounted so that its surface is tilted at an angle $\phi$ which is other than zero relative to a reference plane which is normal with respect to an axis of an outgoing light beam.

4. A laser light beam radiating device comprising:
a laser medium arranged between a pair of mirror members constituting a resonator;
a laser light source for radiating a laser light from an incident side one of said mirror members for exciting said laser medium;
a non-linear optical crystal irradiated with a light beam emanated from said laser medium,
a deflective mirror for deviating the laser light beam radiated from said resonator by 90 degrees to an optical axis;
a casing having housed therein said pair of mirror members, said laser medium, said light source, said non-linear optical crystal element and said 90 degrees deflective mirror, said casing also having a window in which an optical element that exhibits wavelength selectivity and is mounted so as to receive the laser light beam which has been deflected by said deflective mirror, and said optical element mounted so that its surface is tilted at an angle $\phi$ which is other than zero relative to a reference plane which is normal to said optical axis.

5. An optical pickup apparatus comprising:
a laser light beam radiating device having a laser medium arranged between a pair of mirror members constituting a resonator, a laser light source for radiating a laser light from an incident side one of said mirror members for exciting said laser medium, a non-linear optical crystal element irradiated with a light beam emanated from said laser medium, a deflective mirror for deviating the laser light beam from one of said mirror members by 90 degrees to an optical axis, a casing having housed therein said pair of mirror members, said laser medium, said laser light source, said non-linear optical crystal element and said deflective mirror, said casing having a window in which an optical element that exhibits wavelength selectivity and is mounted so as to receive the laser light beam radiated from said deflective mirror, said optical element mounted so that its surface is tilted at an angle $\phi$ which is other than zero relative to a reference plane which is normal to said optical axis;
a beam expander arranged on the optical axis of the light beam radiated from said optical element;
a collimator lens for collimating the light beam transmitted through said beam expander into a parallel beam;
an objective lens for converging the light beam from said collimator lens on a recording medium;
a beam splitter arranged between said objective lens and said beam expander for separating the laser light beam radiated from said laser light beam radiating device from the light beam reflected from said recording medium; and
a photodetector for receiving the light beams separated by said beam splitter.

* * * * *